United States Patent
Zhang et al.

(10) Patent No.: US 9,715,725 B2
(45) Date of Patent: Jul. 25, 2017

(54) CONTEXT-BASED INSPECTION FOR DARK FIELD INSPECTION

(71) Applicant: KLA-Tencor Corporation, Milpitas, CA (US)

(72) Inventors: Yong Zhang, Cupertino, CA (US); Tao Luo, Fremont, CA (US); Chaohong Wu, Mountain View, CA (US); Stephanie Chen, Fremont, CA (US); Lisheng Gao, Morgan Hill, CA (US)

(73) Assignee: KLA-Tencor Corp., Milpitas, CA (US)

( * ) Notice: Subject to any disclaimer, the term of this patent is extended or adjusted under 35 U.S.C. 154(b) by 117 days.

(21) Appl. No.: 14/563,845

(22) Filed: Dec. 8, 2014

(65) Prior Publication Data

US 2015/0178907 A1    Jun. 25, 2015

Related U.S. Application Data

(60) Provisional application No. 61/919,710, filed on Dec. 21, 2013.

(51) Int. Cl.
    *G06K 9/46*    (2006.01)
    *G06T 7/00*    (2017.01)
    *G06T 7/33*    (2017.01)

(52) U.S. Cl.
    CPC .............. *G06T 7/001* (2013.01); *G06T 7/33* (2017.01); *G06T 2207/30148* (2013.01)

(58) Field of Classification Search
    None
    See application file for complete search history.

(56) References Cited

U.S. PATENT DOCUMENTS

| 7,570,796 | B2 | 8/2009 | Zafar et al. |
| 7,676,077 | B2 | 3/2010 | Kulkarni et al. |
| 2002/0199164 | A1* | 12/2002 | Sengupta ............... G06K 9/32 382/278 |
| 2006/0291714 | A1* | 12/2006 | Wu ................... G01N 21/95607 382/149 |
| 2007/0035728 | A1 | 2/2007 | Kekare et al. |
| 2007/0288219 | A1 | 12/2007 | Zafar et al. |
| 2013/0064442 | A1 | 3/2013 | Chang et al. |
| 2013/0182938 | A1 | 7/2013 | Huang |

OTHER PUBLICATIONS

International Search Report and Written Opinion for PCT/US2014/071438 mailed on Apr. 17, 2015.

* cited by examiner

*Primary Examiner* — Mark Roz
(74) *Attorney, Agent, or Firm* — Ann Marie Mewherter

(57) ABSTRACT

Methods and systems for detecting defects on a wafer are provided. One method includes altering one or more design clips based on how the one or more design clips will appear in output generated by a wafer inspection process for a wafer. The method also includes aligning the one or more altered design clips to the output generated for the wafer during the wafer inspection process. In addition, the method includes detecting defects on the wafer based on the output aligned to the one or more altered design clips.

33 Claims, 2 Drawing Sheets

CONTEXT-BASED INSPECTION FOR DARK FIELD INSPECTION

BACKGROUND OF THE INVENTION

1. Field of the Invention

This invention generally relates to methods and systems for context-based inspection for dark field inspection.

2. Description of the Related Art

The following description and examples are not admitted to be prior art by virtue of their inclusion in this section.

Wafer inspection, using either optical or electron beam technologies, is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die on the wafer. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an array area (the rest of the areas are called random or logic areas). To achieve better sensitivity, advanced inspection systems employ different strategies for inspecting the array areas and the random or logic areas.

Context-based inspection (CBI) was previously invented for bright field (BF) inspection systems. To ensure that the micro care areas (MCAs or hot spots that are high potential defect areas) will be accurately overlaid on the inspection optics image frames, patch to design alignment (PDA) is performed. PDA generally includes setup and runtime steps. At setup, a set of "best patterns" are selected from each optical swath image and then they are used to correlate with the corresponding design clips to acquire the shift between the optical images and corresponding design. These optics image patches and corresponding design clips are saved in the inspection recipe. At inspection time, the selected optical image patches are correlated to the corresponding run time patches to figure out the shift between the optics image patches at setup time and run time. Then, the shift between the optics patch and design clip at setup time will be further applied to figure out the shift between design and wafer images at run time so that design-based MCAs are correctly applied to the inspection image patches.

The methods described above were designed for BF inspection systems that have the following characteristics that enable wafer die coordinate accuracies that render the systems suitable for the above-described methods. For example, BF systems typically have a dedicated run time alignment (RTA) image computer that performs the RTA among dies. In addition, the BF inspection systems typically have a dedicated premap swath to ensure that the pixel coordinates of corresponding pixels in different dies are relatively accurate. This way, as long as the relative shift between design clip and optics image on a selected die is determined, the same shift can be applied to all other die with confidence. Unfortunately, this kind of die coordinate accuracy cannot be achieved in some inspection systems such as some laser scanning inspection systems. Therefore, although the CBI described above has provided significant benefits for inspection systems having such configurations, such inspection cannot necessarily be performed on inspection systems that are not capable of the wafer die coordinate accuracies described above.

Accordingly, it would be advantageous to develop methods and systems for wafer inspection that do not have one or more of the disadvantages described above.

SUMMARY OF THE INVENTION

The following description of various embodiments is not to be construed in any way as limiting the subject matter of the appended claims.

One embodiment relates to a computer-implemented method for detecting defects on a wafer. The method includes altering one or more design clips based on how the one or more design clips will appear in output generated by a wafer inspection process for a wafer. The method also includes aligning the one or more altered design clips to the output generated for the wafer during the wafer inspection process. In addition, the method includes detecting defects on the wafer based on the output aligned to the one or more altered design clips. The altering, aligning, and detecting steps are performed by one or more computer systems.

Each of the steps of the computer-implemented method described above may be performed as described further herein. The computer-implemented method described above may include any other step(s) of any other method(s) described herein. The computer-implemented method described above may be performed using any of the systems described herein.

Another embodiment relates to a computer-implemented method for wafer inspection. This method includes aligning one or more altered design clips to output generated for a wafer during a wafer inspection process. The one or more altered design clips are generated based on how one or more design clips will appear in the output. The method also includes detecting defects on the wafer based on the output aligned to the one or more altered design clips. The aligning and detecting steps are performed by a computer system.

Each of the steps of the computer-implemented method described above may be performed as described further herein. The computer-implemented method described above may include any other step(s) of any other method(s) described herein. The computer-implemented method described above may be performed using any of the systems described herein.

Another embodiment relates to a non-transitory computer-readable medium storing program instructions executable on a computer system for performing a computer-implemented method for detecting defects on a wafer. The computer-implemented method includes the steps described above. The computer-readable medium may be further configured as described herein. The steps of the method may be performed as described further herein. In addition, the method for which the program instructions are executable may include any other step(s) of any other method(s) described herein.

An additional embodiment relates to a system configured to detect defects on a wafer. The system includes an optical inspection subsystem configured to generate output for a wafer. The system also includes a computer subsystem configured for performing the steps of the method described above. The system may be further configured as described herein.

BRIEF DESCRIPTION OF THE DRAWINGS

Other objects and advantages of the invention will become apparent upon reading the following detailed description and upon reference to the accompanying drawings in which.

Figure 1:
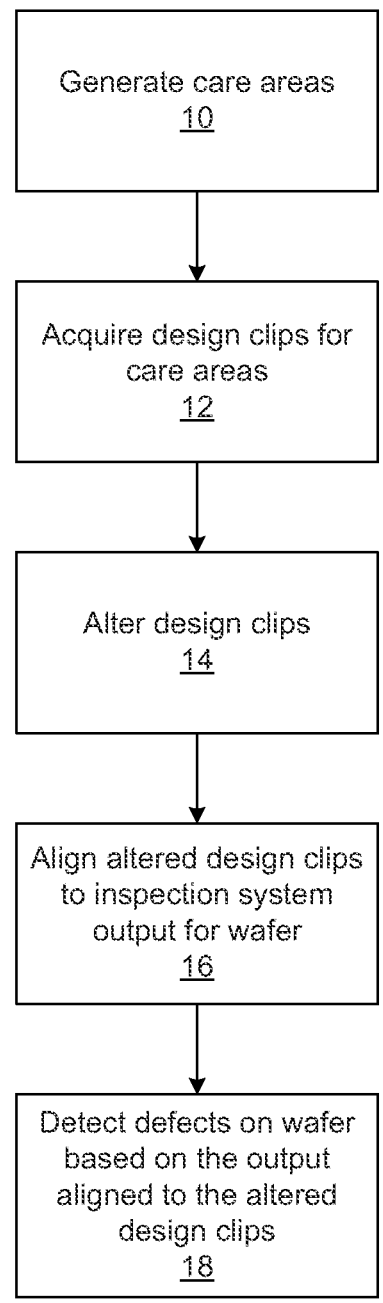
FIG. 1 is a flow chart illustrating one embodiment of a computer-implemented method for detecting defects on a wafer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The terms "design" and "design data" as used herein generally refer to the physical design (layout) of an IC and data derived from the physical design through complex simulation or simple geometric and Boolean operations. The design may be stored in a data structure such as a GDS or ASCii file, any other standard machine-readable file, any other suitable file known in the art, and a design database. For all intents and purposes, the term "GDS" is used for a GDSII file. Other examples of such files include GL1 and OASIS files. The design used in the embodiments described herein may be stored in any of this entire class of files irrespective of data structure configuration, storage format, or storage mechanism.

An image of a reticle acquired by a reticle inspection system and/or derivatives thereof can also be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

One embodiment relates to a computer-implemented method for detecting defects on a wafer. The embodiments described herein can improve laser scanning inspection sensitivity and reduce irrelevant nuisance by incorporating design-based micro care areas (MCAs) into laser scanning systems. For example, the embodiments described herein overcome the limitations of currently used dark field (DF) inspection systems that have lower resolution compared to bright field (BF) systems and lack the BF system hardware components that ensure the accurate run time alignment (RTA) among dies and uniform distribution of die size (achieved via a premap swath). Because of that, the current approach that is used by the BF tools will not work for most (if not all) DF tools. In addition, because images of scattered light typically do not resemble the anatomical structure of the current layer design, current approaches used for BF patch-to-design alignment (PDA) cannot be directly used for DF PDA without significant changes.

With the embodiments described further herein, however, DF context-based inspection (CBI) becomes feasible. In addition, as will be described further herein, the setup can be job-based and therefore distributed among different nodes of an image computer. As such, parallel processing can be used. As a result, one advantage of the embodiments described further herein is that they can be used to achieve the purpose of accurate relocating of design-based MCAs without the expensive hardware/software capabilities of BF systems. Although the embodiments will be described further herein as being used for DF PDA, clearly the embodiments described herein can be used for BF inspection and/or other types of inspection in which the output generated for a wafer during inspection does not necessarily resemble the design data printed on the wafer.

The method includes altering one or more design clips based on how the one or more design clips will appear in output generated by a wafer inspection process for a wafer. For example, as shown in FIG. 1, the method includes altering design clips in step 14. In one embodiment, the output generated for the wafer during the wafer inspection process is responsive to light scattered from the wafer. For example, as mentioned above, images of scattered light generated by an inspection system generally will not resemble the geometrical structure of design data printed on a wafer. Therefore, the design clip(s) are preferably altered such that they represent the design data as it will be imaged by a wafer inspection system, which may be performed as described further herein. The altered design clip(s) may have any suitable format such as data, image data, image signals, etc. In one such example, the altered design clip(s) may be pixel-based binary masks that can be used in the aligning step described further herein. Therefore, the methods described herein are significantly different than BF CBI, because BF CBI does not include any such design clip alteration. The term "design clip" as used herein generally refers to a relatively small portion of a design or design data for a wafer, which may include any of the design or design data described herein.

In another embodiment, the one or more design clips correspond to only care areas on the wafer. For example, as shown in FIG. 1, the method may include generating care areas in step 10. At setup time, hot spots (or MCAs) can be generated by a special engine based on design file(s) and customer care rules. This may be performed as in currently used BF CBI, and this step is usually performed through collaboration with a customer who provides the design information. The hot spot locations may be defined with respect to a die. In addition, the care areas may be generated in any other suitable manner known in the art.

As also shown in FIG. 1, the method may include acquiring design clips for care areas in step 12. For example, the design clips can be extracted from a design data file based on the design data coordinates of the hot spot locations. In addition, once the die specific hot spot locations are available, the corresponding design clips can be generated through an existing design-based binning (DBB) engine. Each of the design clips may have an area of 50 micron by 50 micron. The design clips are usually for the current layer being inspected on the wafer. The design clips may be extracted from the design based on the hot spot locations as is currently performed in CBI. In addition, during a setup stage, the job layout for the wafer inspection process is defined as long as pixel size is defined for the wafer inspection process. So the design clip processing is only needed for those jobs that contain MCAs (hot spots). The altered design clip(s) can be viewed as design-based templates that will be used for relocating the MCAs via correlation with light scattering images at inspection runtime.

In some embodiments, altering the design clip(s) includes determining how the one or more design clips will appear in the output based on one or more parameters of the wafer inspection process. For example, laser scanning scattered light images most of the time do not resemble the design structures for which they were generated. In addition, light scattering images usually only partially resemble the anatomical structure in the corresponding design clip of the current layer being inspected because of the laser scanning optical parameters and structures on the wafer from one or more previous layers formed on the wafer. Therefore, the design clip(s) may be altered based on any of the parameter(s) of the wafer inspection process that will be used for generating output (such as images, image signals, image data, etc.) for the wafer. As such, the one or more parameters may include any optical parameter(s) of the wafer inspection process. Determining how the one or more design clips will appear in the output of the wafer inspection system may also be performed based on how the design will be printed on a wafer. Therefore, determining how the design clip(s) will appear in the output may include a simulation of some sort (for the wafer inspection process and possibly the wafer fabrication process) that can predict the wafer inspection tool output. However, determining how the one or more design clips will appear in the output may be performed using any suitable method, algorithm, model, simulation engine, and the like.

In an additional embodiment, altering the design clip(s) includes determining how the one or more design clips will appear in the output based on a resolution of a wafer inspection system used for the wafer inspection process. For example, although design clips that appear as they do in the design data for a wafer can sometimes be aligned to BF images of a wafer generated by a BF wafer inspection system, laser scanning inspection systems generally have lower resolutions than BF wafer inspection systems. As such, because of resolution differences between the design clip (usually tens of nanometers) and the light scattering images (around 200 nanometers), the design clips should be processed into a lower resolution such that they can be aligned with the light scattering images as described further herein with substantially high accuracy. Therefore, the design clip(s) may be processed to be close to the resolution of the wafer inspection system used for the wafer inspection process. Altering the resolution of the design clip(s) to the resolution of the wafer inspection process may be performed as described above (e.g., where the one or more parameters used in the embodiment described above include or at least partially define the resolution).

In another embodiment, altering the design clip(s) includes eliminating one or more features in the one or more design clips that will not appear in the output. For example, certain design structures may not appear in scattered light images generated for a wafer by a DF wafer inspection system. In one such example, vertical structures in a design clip may not appear in a light scattering image. As such, the design clip may be processed (to "prune" the vertical structures and/or other structures) so that the altered design clip looks similar to the light scattering image. Therefore, the design clips may be processed to remove certain structures that will be invisible (or will not show) in the light scattering images. In this manner, the altering step may include "pruning" the design clips and rendering the pruned design clips using the corresponding optics image pixel sizes for a more reliable alignment result between the design and the optical image.

In a further embodiment, the method includes selecting one or more features in the one or more altered design clips that are used for the aligning described further herein. In this manner, the embodiments described herein may include choosing the correct image or design feature to be used for alignment between design clip and corresponding laser scanner scatter images. In addition, the anchor point(s) used for alignment are selected based on the altered design clip(s). Finding the anchor points in the design clips is an optional step. The anchor points may be selected based on the geometry of the features in the altered design clips (to select one or more features having unique geometries within the design clips) and/or based on the characteristics of the altered design clips (e.g., based on how well the features are imaged in the altered design clips). In addition, although specific features may be selected in the altered design clip(s) for use in the aligning step described further herein such that only a portion of the altered design clip(s) is used for alignment, the entire altered design clip(s) may be used for alignment.

In an additional embodiment, altering the design clip(s) includes eliminating one or more features in the one or more design clips that will not be used for the aligning described further herein. For example, "unnecessary" or "unwanted" design structures (such as repeating structures and vertical lines) can be removed from the altered design clip(s).

In another embodiment, the one or more altered design clips that are aligned to the output are not images acquired by a wafer inspection system. For example, the embodiments described herein seek anchoring templates for use in alignment from a design clip rather than an optical image (as is normally performed in BF CBI). In this manner, the method may include finding a design template (or target) rather than finding an optics image template. Because of that, the design clip needs to be processed such that the design information more accurately resembles how it will be imaged by a wafer inspection system, which may be performed in a number of different ways described herein.

In some embodiments, altering the one or more design clips is not performed during the wafer inspection process. For example, steps performed prior to and/or involved in design clip alteration such as selecting candidate design clip structures for inspection time PDA may be performed during setup time. The job-based design clip processing (pruning, etc.) can be done at the image computer level for better parallel processing for throughput considerations. The processed design clip information can be saved in a die specific level and be ready to be used at the inspection run time.

The method includes aligning the one or more altered design clips to the output generated for the wafer during the wafer inspection process. For example, as shown in FIG. 1, the method includes aligning altered design clips to inspection system output for a wafer in step 16. In one such example, during DF CBI run time, when the inspection reaches the leaf algorithm, if the job contains a CBI hot spot definition (i.e., MCAs), the algorithm will get a corresponding altered design clip, generated as described further herein, to perform "design template" to scattered image alignment. In this manner, the alignment step may include aligning job frames to an altered design clip for jobs with an MCA. The aligning may be performed using the entire altered design clip. However, the aligning may be performed using only the anchor points identified in the altered design clips as described further herein. Once the alignment has been performed, the locations of the MCAs may be adjusted using any alignment offset determined by the aligning step.

Since the design clip(s) used for the aligning step have been processed as described further herein to be more representative of the design as it will appear in the images generated by the inspection system than the design as it appears in the design data file, the altered design clip(s) described herein are much more suitable for aligning with light scattering images than design clips extracted from a design data file. Indeed, initial prototype experiments have already shown very good correlation results between the "design template" and the corresponding DF image. This approach is different from the rendering in currently used BF CBI PDA as the alignment step described herein may not include filling the design clip mask pixels with intensity values. Special treatment may also be used for aligning "design templates" with scattered light images. As different DF wafer images are used in the embodiments described herein, new approaches for aligning the altered design clip(s) and the DF images may be added. Aligning the design clips and the inspection images may be performed in any suitable manner (e.g., using a pattern matching method, algorithm, etc.).

In one embodiment, the method includes determining if one or more features in the output correspond to previous layer features on a layer of the wafer other than a layer being inspected in the wafer inspection process and eliminating the one or more features corresponding to the previous layer features from the output prior to the detecting step described further herein. In this manner, the current layer design information in the altered design clips can be used to exclude previous layer nuisance from inspection even though the previous layer structures are in the same inspection region/segments. In one such example, portions of the inspection images that appear to correspond to patterned features on the wafer but are not included in the altered design clips may be eliminated from the inspection images prior to defect detection performed as described further herein.

The method includes detecting defects on the wafer based on the output aligned to the one or more altered design clips. For example, as shown in FIG. 1, the method includes detecting defects on a wafer based on the output aligned to the altered design clips in step 18. In one such example, once an MCA is relocated, the MCA based CBI may be performed. In other words, the defect detection performed in the embodiments described herein may be MCA-based detection. In addition, once the output corresponding to the care areas has been located via the aligning step, the defects may be detected on the wafer using any appropriate defect detection algorithm and/or method. In other words, the embodiments described herein are not specific to any particular defect detection algorithm and/or method.

In some embodiments, the aligning and detecting steps are performed for only one or more logic regions of the wafer. For example, the embodiments described herein can utilize design information as described herein to improve light scattering inspection in logic regions to improve defect capture and reduce the impact from the nuisance in the neighboring area which is irrelevant to the defect in terms of design-based rules.

In an additional embodiment, the output aligned to the one or more altered design clips includes a first portion of the output generated for a first die on the wafer, the detecting step includes aligning second and third portions of the output generated for second and third dies on the wafer, respectively, to the first portion of the output and detecting the defects based on one or more comparisons of the first, second, and third portions of the output, and the second and third dies are adjacent to the first die on the wafer. In this manner, the wafer inspection process may be a 3-die inspection type process (in a so called "3-in, 3-out" type system). For example, once the alignment is performed, the shift in X and Y between the design template and the scattered light image can be used to relocate the MCA corresponding to the design clip used in the alignment to the center die job frame. In DF inspection, a 3-die based inspection job layout may be used, in which any RTA is performed for the two side die job frames to align with the center die job frame (even subframe based). In this manner, the maximum shift may be less than 0.5 pixels.

In some embodiments, detecting the defects is performed for only the output aligned to the one or more altered design clips. For example, as is described further herein, the alignment step may only be performed for jobs of inspection system output that contain one or more care areas. Therefore, the alignment step may only be performed for care areas and the defect detection may only be performed in the care areas. Limiting alignment to only the jobs that contain a care area will reduce the image/data processing involved in the wafer inspection process. In addition, limiting defect detection to only the care areas will reduce the nuisance detected by the inspection process and thereby enable an increase in the sensitivity of the inspection process.

In a further embodiment, the aligning and detecting steps are separately performed for each die inspected during the wafer inspection process. In another embodiment, the aligning and detecting steps are separately performed for each portion of the output generated for an area on the wafer in which a care area is located. In a further embodiment, results of the aligning step are not used to align all dies in a swath of the output generated for the wafer during the wafer inspection process. For example, the steps of the methods described herein may only be performed for the jobs that contain MCAs. In addition, the embodiments described herein may be performed for each MCA included in each die in which defect detection is performed. In other words, alignment is not performed in the embodiments described herein in one location or a limited number of locations and then extrapolated across the wafer via some coordinate transformation.

The same high accuracy MCA location can, therefore, be achieved in DF inspection as can currently be achieved for BF inspection. For example, unlike some BF inspection systems, the wafer inspection systems for which the embodiments described herein were invented have no RTA processing and no premap swaths. There is, therefore, no absolute shift adjustment from all dies in a swath to a pre-selected reference die. As a result, the existing CBI approach is not applicable to DF inspection due to system and defect location accuracy limitations in the DF inspection systems. It is, however, desirable to achieve the same coordinate accuracy in DF systems as has previously been achieved in BF systems. The embodiments described herein were, therefore, created to overcome the limitations of the DF systems. For example, instead of relying on building a universal translational relationship between the design and one particular die for each swath at preparation (or called "recipe setup" in current wafer inspection systems) and applying this information into runtime inspection as is done in currently used CBI, the embodiments described herein perform PDA at the run time inspection step. With this approach, the stage location uncertainty-induced defect location accuracy shift and care area shift will not impact the accuracy of the placement of the design-based MCAs. In addition, the embodiments described herein do not need to rely on expensive hardware/software support for accurately aligning all dies in a swath.

The altering, aligning, and detecting steps described herein are performed by one or more computer systems, which may be configured as described further herein.

Another embodiment relates to a computer-implemented method for wafer inspection. This method includes aligning one or more altered design clips to output generated for a wafer during a wafer inspection process, which may be performed as described further herein. The one or more altered design clips are generated based on how one or more design clips will appear in the output. The altered design clip(s) may include any of the altered design clips described herein. The method also includes detecting defects on the wafer based on the output aligned to the one or more altered design clips, which may be performed according to any of the embodiments described herein. The aligning and detecting steps of this embodiment are performed by a computer system, which may be configured as described further herein.

The methods described herein may also include storing results of any of the step(s) of any of the methods in a computer-readable storage medium. The results may include any of the results described herein and may be stored in any manner known in the art. The storage medium may include any suitable storage medium known in the art. After the results have been stored, the results can be accessed in the storage medium and used as described herein, formatted for display to a user, used by another software module, method, or system, etc.

Figure 2:
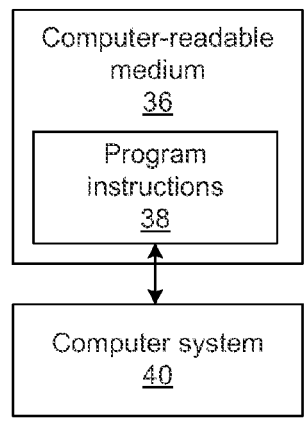
FIG. 2 is a block diagram illustrating one embodiment of a non-transitory computer-readable medium that includes program instructions executable on a computer system for performing one or more of the computer-implemented method embodiments described herein.

Another embodiment relates to a non-transitory computer-readable medium storing program instructions executable on a computer system for performing a computer-implemented method for detecting defects on a wafer. One such embodiment is shown in FIG. 2. For example, as shown in FIG. 2, computer-readable medium 36 stores program instructions 38 executable on computer system 40 for performing the computer-implemented method described above. The computer-implemented method for which the program instructions are executable may include any other step(s) of any other method(s) described herein.

Program instructions 38 implementing methods such as those described herein may be stored on computer-readable medium 40. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 40 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 3:
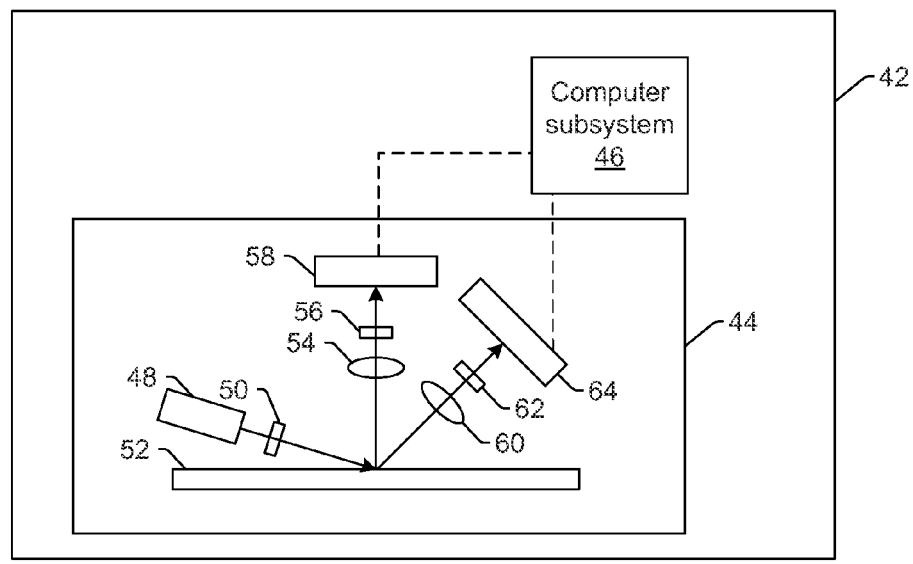
FIG. 3 is a schematic diagram illustrating a side view of one embodiment of a system configured to detect defects on a wafer.

An additional embodiment relates to a system configured to detect defects on a wafer. One embodiment of such a system is shown in FIG. 3. As shown in FIG. 3, system 42 includes optical inspection subsystem 44 and computer subsystem 46. The optical inspection subsystem is configured to generate output for a wafer. For example, as shown in FIG. 3, the inspection subsystem includes light source 48 such as a laser. Light source 48 is configured to direct light to polarizing component 50. In addition, the inspection subsystem may include more than one polarizing component (not shown), each of which may be positioned independently in the path of the light from the light source. Each of the polarizing components may be configured to alter the polarization of the light from the light source in a different manner. The inspection subsystem may be configured to move the polarizing components into and out of the path of the light from the light source in any suitable manner depending on which polarization setting is selected for illumination of the wafer during a scan. The polarization setting used for the illumination of the wafer during a scan may include p-polarized (P), s-polarized (S), or circularly polarized (C).

Light exiting polarizing component 50 is directed to wafer 52 at an oblique angle of incidence, which may include any suitable oblique angle of incidence. The inspection subsystem may also include one or more optical components (not shown) that are configured to direct light from light source 48 to polarizing component 50 or from polarizing component 50 to wafer 52. The optical components may include any suitable optical components known in the art such as, but not limited to, a reflective optical component. In addition, the light source, the polarizing component, and/or the one or more optical components may be configured to direct the light to the wafer at one or more angles of incidence (e.g., an oblique angle of incidence and/or a substantially normal angle of incidence). The inspection subsystem may be configured to perform the scanning by scanning the light over the wafer in any suitable manner.

Light scattered from wafer 52 may be collected and detected by multiple channels of the inspection subsystem during scanning. For example, light scattered from wafer 52 at angles relatively close to normal may be collected by lens 54. Lens 54 may include a refractive optical element as shown in FIG. 3. In addition, lens 54 may include one or more refractive optical elements and/or one or more reflective optical elements. Light collected by lens 54 may be directed to polarizing component 56, which may include any suitable polarizing component known in the art. In addition, the inspection subsystem may include more than one polarizing component (not shown), each of which may be positioned independently in the path of the light collected by the lens. Each of the polarizing components may be configured to alter the polarization of the light collected by the lens in a different manner. The inspection subsystem may be configured to move the polarizing components into and out of the path of the light collected by the lens in any suitable manner depending on which polarization setting is selected for detection of the light collected by lens 54 during scanning. The polarization setting used for the detection of the light collected by lens 54 during scanning may include any of the polarization settings described herein (e.g., P, S, and unpolarized (N)).

Light exiting polarizing component 56 is directed to detector 58. Detector 58 may include any suitable detector known in the art such as a charge coupled device (CCD) or another type of imaging detector. Detector 58 is configured to generate output that is responsive to the scattered light collected by lens 54 and transmitted by polarizing component 56 if positioned in the path of the collected scattered light. Therefore, lens 54, polarizing component 56 if positioned in the path of the light collected by lens 54, and detector 58 form one channel of the inspection subsystem. This channel of the inspection subsystem may include any other suitable optical components (not shown) known in the art such as a Fourier filtering component.

Light scattered from wafer 52 at different angles may be collected by lens 60. Lens 60 may be configured as described above. Light collected by lens 60 may be directed to polarizing component 62, which may include any suitable polarizing component known in the art. In addition, the inspection subsystem may include more than one polarizing component (not shown), each of which may be positioned independently in the path of the light collected by the lens. Each of the polarizing components may be configured to alter the polarization of the light collected by the lens in a different manner. The inspection subsystem may be configured to move the polarizing components into and out of the path of the light collected by the lens in any suitable manner depending on which polarization setting is selected for detection of the light collected by lens 60 during scanning. The polarization setting used for detection of the light collected by lens 60 during scanning may include P, S, or N.

Light exiting polarizing component 62 is directed to detector 64, which may be configured as described above. Detector 64 is also configured to generate output that is responsive to the collected scattered light that passes through polarizing component 62 if positioned in the path of the scattered light. Therefore, lens 60, polarizing component 62 if positioned in the path of the light collected by lens 60, and detector 64 may form another channel of the inspection subsystem. This channel may also include any other optical components (not shown) described above. In some embodiments, lens 60 may be configured to collect light scattered from the wafer at polar angles from about 20 degrees to about 70 degrees. In addition, lens 60 may be configured as a reflective optical component (not shown) that is configured to collect light scattered from the wafer at azimuthal angles of about 360 degrees.

The inspection subsystem shown in FIG. 3 may also include one or more other channels (not shown). For example, the inspection subsystem may include an additional channel, which may include any of the optical components described herein such as a lens, one or more polarizing components, and a detector, configured as a side channel. The lens, the one or more polarizing components, and the detector may be further configured as described herein. In one such example, the side channel may be configured to collect and detect light that is scattered out of the plane of incidence (e.g., the side channel may include a lens, which is centered in a plane that is substantially perpendicular to the plane of incidence, and a detector configured to detect light collected by the lens).

Computer subsystem 46 is configured to acquire the output generated by the inspection subsystem. For example, output generated by the detectors during scanning may be provided to computer subsystem 46. In particular, the computer subsystem may be coupled to each of the detectors (e.g., by one or more transmission media shown by the dashed lines in FIG. 3, which may include any suitable transmission media known in the art) such that the computer subsystem may receive the output generated by the detectors. The computer subsystem may be coupled to each of the detectors in any suitable manner. The output generated by the detectors during scanning of the wafer may include any of the output described herein.

The computer subsystem is configured for performing the steps of the method described herein. The computer subsystem may also be configured to perform any other step(s) of any method embodiment(s) described herein. The computer subsystem, the inspection subsystem, and the system may be further configured as described herein.

It is noted that FIG. 3 is provided herein to generally illustrate one configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the Puma 90xx, 91xx, and 93xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, methods and systems for detecting defects on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for detecting defects on a wafer, comprising:
    altering one or more design clips for a current layer being inspected on the wafer based on how the one or more design clips printed on a wafer will appear in output generated by a wafer inspection process for the wafer;
    aligning the one or more altered design clips to the output generated for the wafer during the wafer inspection process;
    determining if one or more features in the output correspond to previous layer features on a layer of the wafer other than the current layer being inspected in the wafer inspection process by identifying portions of the output that appear to correspond to patterned features on the wafer that are not included in the one or more altered design clips as corresponding to the previous layer features and eliminating the one or more features corresponding to the previous layer features from the output prior to detecting defects on the wafer; and
    detecting the defects on the wafer based on the output aligned to the one or more altered design clips, wherein said altering, aligning, and detecting are performed by one or more computer systems.

2. The method of claim 1, wherein the output generated for the wafer during the wafer inspection process is responsive to light scattered from the wafer.

3. The method of claim 1, wherein the one or more design clips correspond to only care areas on the wafer.

4. The method of claim 1, wherein said altering comprises determining how the one or more design clips printed on the wafer will appear in the output based on one or more parameters of the wafer inspection process.

5. The method of claim 1, wherein said altering comprises determining how the one or more design clips printed on the wafer will appear in the output based on a resolution of a wafer inspection system used for the wafer inspection process.

6. The method of claim 1, Wherein said altering comprises eliminating one or more features in the one or more design clips that will not appear in the output.

7. The method of claim 1, further comprising selecting one or more features in the one or more altered design clips that are used for said aligning.

8. The method of claim 1, wherein said altering comprises eliminating one or more features in the one or more design clips that will not be used for said aligning.

9. The method of claim 1, wherein the one or more altered design clips that are aligned to the output are not images acquired by a wafer inspection system.

10. The method of claim 1, wherein said altering is not performed during the wafer inspection process.

11. The method of claim 1, wherein said aligning and said detecting are performed for only one or more logic regions of the wafer.

12. The method of claim 1, wherein said aligning and said detecting are separately performed for each die inspected during the wafer inspection process.

13. The method of claim 1, wherein said aligning and said detecting are separately performed for each portion of the output generated for an area on the wafer in which a care area is located.

14. The method of claim 1, wherein the output aligned to the one or more altered design clips comprises a first portion of the output generated for a first die on the wafer, wherein said detecting comprises aligning second and third portions of the output generated for second and third dies on the wafer, respectively, to the first portion of the output and detecting the defects based on one or more comparisons of the first, second, and third portions of the output, and wherein the second and third dies are adjacent to the first die on the wafer.

15. The method of claim 1, wherein detecting the defects is performed for only the output aligned to the one or more altered design clips.

16. The method of claim 1, wherein results of said aligning are not used to align all dies in a swath of the output generated for the wafer during the wafer inspection process.

17. A non-transitory computer-readable medium storing program instructions executable on a computer system for performing computer-implemented method for detecting defects on a wafer, wherein the computer-implemented method comprises:
    altering one or more design clips for a current layer being inspected on the wafer based on how the one or more design clips printed on a wafer will appear in output generated by a wafer inspection process for the wafer;
    aligning the one or more altered design clips to the output generated for the wafer during the wafer inspection process;
    determining if one or more features in the output correspond to previous layer features on a layer of the wafer other than the current layer being inspected in the wafer inspection process by identifying portions of the output that appear to correspond to patterned features on the wafer that are not included in the one or more altered design clips as corresponding to the previous layer features and eliminating the one or more features corresponding to the previous layer features from the output prior to detecting defects on the wafer; and
    detecting the defects on the wafer based on the output aligned to the one or more altered design clips.

18. A system figured to detect defects on a wafer, comprising:
    an optical inspection subsystem configured to generate output for a wafer; and
    a computer subsystem configured for:
        altering one or more design clips for a current layer being inspected on the wafer based on how the one or more design clips printed on the wafer will appear in the output generated by the optical inspection subsystem for the wafer;
        aligning the one or more altered design clips to the output generated for the wafer by the optical inspection subsystem;
        determining if one or more features in the output correspond to previous layer features on a layer of the wafer other than the current layer being inspected in the wafer inspection process by identifying portions of the output that appear to correspond to patterned features on the wafer that are not included in the one or more altered design clips as corresponding to the previous layer features and eliminating the one or more features corresponding to the previous layer features from the output prior to detecting defects on the wafer; and detecting the defects on the wafer based on the output aligned to the one or more altered design clips.

19. The system of claim 18, wherein the output generated by the optical inspection subsystem for the wafer is responsive to light scattered from the wafer.

20. The system of claim 18, wherein the one or more design clips correspond to only care areas on the wafer.

21. The system of claim 18, wherein said altering comprises determining how the one or more design clips printed on the wafer will appear in the output based on one or more parameters of the optical inspection subsystem used to generate the output.

22. The system of claim 18, wherein said altering comprises determining how the one or more design clips printed on the wafer will appear in the output based on a resolution of the optical inspection subsystem.

23. The system of claim 18, wherein said altering comprises eliminating one or more features in the one or more design clips that will not appear in the output.

24. The system of claim 18, wherein the computer subsystem is further configured for selecting one or more features in the one or more altered design clips that are used for said aligning.

25. The system of claim 18, wherein said altering comprises eliminating one or more features in the one or more design clips that will not be used for said aligning.

26. The system of claim 18, wherein the one or more altered design clips that are aligned to the output are not images acquired by the optical inspection subsystem.

27. The system of claim 18, wherein said altering is not performed while the optical inspection subsystem is generating the output for the wafer.

28. The system of claim 18, wherein said aligning and said detecting are performed for only one or more logic regions of the wafer.

29. The system of claim 18, wherein said aligning and said detecting are separately performed for each die for which the output is generated by the optical inspection subsystem.

30. The system of claim 18, wherein said aligning and said detecting are separately performed for each portion of the output generated for an area on the wafer in which a care area is located.

31. The system of claim 18, wherein the output aligned to the one or more altered design clips comprises a first portion of the output generated for a first die on the wafer, wherein said detecting comprises aligning second and third portions of the output generated for second and third dies on the wafer, respectively, to the first portion of the output and detecting the defects based on one or more comparisons of the first, second, and third portions of the output, and wherein the second and third dies are adjacent to the first die on the wafer.

32. The system of claim 18, wherein detecting the defects is performed for only the output aligned to the one or more altered design clips.

33. The system of claim 18, wherein results of said aligning are not used to align all dies in a swath of the output generated for the wafer by the optical inspection subsystem.

\* \* \* \* \*